(12) United States Patent
Tateiwa

(10) Patent No.: US 10,760,489 B2
(45) Date of Patent: Sep. 1, 2020

(54) AIRCRAFT

(71) Applicant: MITSUBISHI AIRCRAFT CORPORATION, Aichi (JP)

(72) Inventor: Jingo Tateiwa, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 610 days.

(21) Appl. No.: 14/552,605

(22) Filed: Nov. 25, 2014

(65) Prior Publication Data

US 2015/0308340 A1 Oct. 29, 2015
US 2017/0248077 A9 Aug. 31, 2017

(30) Foreign Application Priority Data

Nov. 27, 2013 (JP) ................................. 2013-244762

(51) Int. Cl.
*F02C 7/143* (2006.01)
*F02C 7/16* (2006.01)

(52) U.S. Cl.
CPC ............... *F02C 7/143* (2013.01); *F02C 7/16* (2013.01); *Y02T 50/671* (2013.01); *Y02T 50/675* (2013.01)

(58) Field of Classification Search
CPC .... F02C 7/143; F02C 7/16; F02C 7/14; F02C 7/18; F02C 6/08; Y02T 50/671; Y02T 50/675; F01D 25/18; B64D 2013/0603
See application file for complete search history.

(56) References Cited

U.S. PATENT DOCUMENTS

| 5,123,242 | A | 6/1992 | Miller | |
|---|---|---|---|---|
| 5,239,830 | A * | 8/1993 | Banthin | F01D 13/003 60/39.15 |
| 2007/0245739 | A1* | 10/2007 | Stretton | F01D 17/105 60/728 |
| 2008/0230651 | A1* | 9/2008 | Porte | B64D 13/06 244/118.5 |
| 2009/0188234 | A1* | 7/2009 | Suciu | F02C 7/14 60/262 |

(Continued)

FOREIGN PATENT DOCUMENTS

| JP | S47-14900 A | 8/1972 |
|---|---|---|
| JP | H04-232338 A | 8/1992 |

(Continued)

OTHER PUBLICATIONS

Office Action issued in Japanese Patent Application No. 2013-244762 dated Aug. 30, 2017.

*Primary Examiner* — Todd E Manahan
*Assistant Examiner* — Katheryn A Malatek
(74) *Attorney, Agent, or Firm* — Pearne & Gordon LLP

(57) ABSTRACT

An aircraft including a turbofan engine provided with an engine body and a fan located anterior to the engine body, further includes: an engine oil cooler that is a heat exchanger for cooling engine oil used in the engine body by using, as a heat source, a fan stream flowing from the fan into a gap between a core cowl surrounding the engine body and a nacelle surrounding the fan and the core cowl; and a pre-cooler that is a heat exchanger for cooling bleed air from the engine body by using the fan stream as a heat source, wherein the engine oil cooler and the pre-cooler are longitudinally arranged in one position in a circumferential direction of the nacelle, and the engine oil cooler is located anterior to the pre-cooler.

18 Claims, 6 Drawing Sheets

(56) References Cited

U.S. PATENT DOCUMENTS

| | | | | |
|---|---|---|---|---|
| 2010/0061839 | A1* | 3/2010 | Bartolomeo | F02C 7/32 |
| | | | | 415/122.1 |
| 2012/0187214 | A1* | 7/2012 | Welch | B64D 33/04 |
| | | | | 239/265.19 |
| 2012/0285138 | A1 | 11/2012 | Todorovic | |
| 2013/0098057 | A1* | 4/2013 | Suciu | F02C 9/16 |
| | | | | 60/779 |

FOREIGN PATENT DOCUMENTS

| | | | |
|---|---|---|---|
| JP | H11-324672 A | 11/1999 | |
| JP | 4805352 B2 | 8/2011 | |
| WO | WO 2012125895 A1 * | 9/2012 | B64D 13/08 |

* cited by examiner

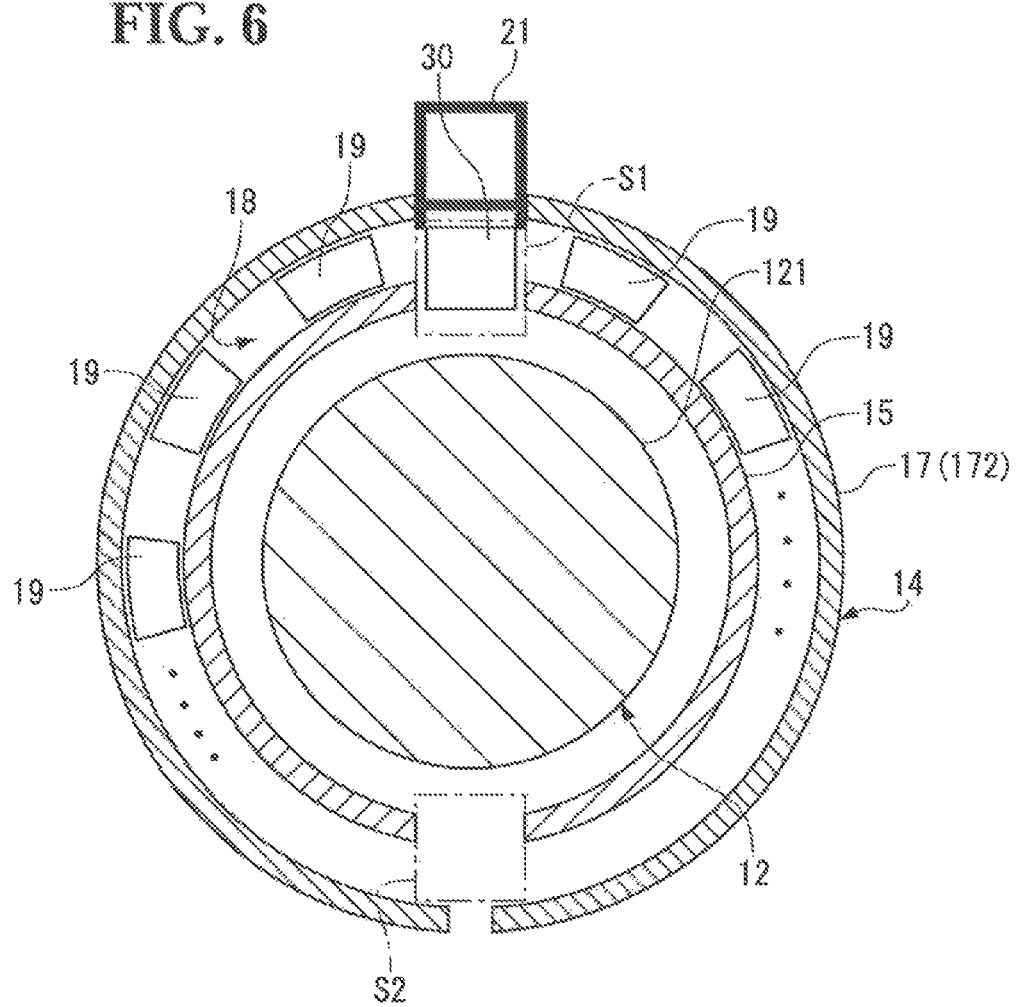

AIRCRAFT

BACKGROUND OF THE INVENTION

1. Field of the Invention

The present invention relates to an aircraft including a turbofan engine, and more particularly, to arrangement of an engine oil cooler and a pre-cooler.

2. Description of the Related Art

A turbofan engine of an aircraft includes a fan that is rotated by power produced by the engine. When the turbofan engine is operated, air is distributed into an engine body and a bypass flow path formed on the inner side of a nacelle. Air passing through the bypass flow path and air discharged from a nozzle of the engine body join together to be ejected backward. Thrust is obtained by the reaction of the jet stream.

Generally, the engine is equipped with various accessories, such as a fuel control unit, a fuel pump, an igniter, and a plurality of heat exchangers. The accessories are provided around, above and below the engine and the fan within the nacelle.

Examples of the accessories include a pre-cooler that cools bleed air from the engine so as to use the bleed air for a cabin air-conditioner or the like (Japanese Patent No. 4805352), and an engine oil cooler that cools engine oil.

Both the engine oil cooler and the pre-cooler are heat exchangers that use the air flowing through the bypass flow path (hereinafter, referred to as a fan stream) as a heat source (a low-temperature source) in the turbofan engine. The fan stream is sucked therein from the bypass flow path, and exhausted after heat exchange with the engine oil and the engine bleed air.

In order to sufficiently exert a heat exchange capacity, the engine oil cooler and the pre-cooler mounted to the turbofan engine are preferably provided at positions where the fan stream can be sufficiently introduced.

For example, it is assumed that the pre-cooler is provided in an upper portion within the bypass flow path of the engine body. In this case, the engine oil cooler is preferably arranged at a circumferentially different position from the pre-cooler, such as a position lateral to the engine body, so as to sufficiently introduce the fan stream therein without being disturbed by the pre-cooler.

However, in many cases, the engine oil cooler or the pre-cooler cannot be provided at a favorable position since its installation space is limited due to interference with another accessory or the like. Particularly, in medium and small aircrafts having a smaller engine size than that of a large aircraft, the accessories are concentrated around the engine body. Thus, the installation space is greatly limited.

When the fan stream is blocked by the engine oil cooler and the pre-cooler, smaller thrust is obtained, and fuel consumption is deteriorated.

Here, if the diameter of the nacelle is increased with respect to the diameter of the engine body, a required flow rate can be ensured. However, since it is necessary to ensure a height equal to or larger than a specified height between the nacelle and the ground, the diameter of the nacelle may not be enlarged in some cases. The nacelle diameter can be enlarged by increasing the length of a main landing gear. However, a weight increase is caused, and the fuel consumption is deteriorated.

Based on the above problems, an object of the present invention is to provide an aircraft including a turbofan engine which can secure a heat exchange capacity of each of an engine oil cooler and a pre-cooler while avoiding a deterioration in fuel consumption even when an accessory installation space is limited.

SUMMARY OF THE INVENTION

An aircraft of the present invention is an aircraft including a turbofan engine provided with an engine body and a fan located anterior to the engine body, further including: an engine oil cooler that is a heat exchanger for cooling engine oil used in the engine body by using, as a heat source, a fan stream flowing from the fan into a gap between a core cowl surrounding the engine body and a nacelle surrounding the fan and the core cowl; and a pre-cooler that is a heat exchanger for cooling bleed air from the engine body by using the fan stream as a heat source.

In the present invention, the engine oil cooler and the pre-cooler are longitudinally arranged in one position (one region) in a circumferential direction of the nacelle, and the engine oil cooler is located anterior to the pre-cooler.

In the present invention, the engine oil cooler and the pre-cooler are arranged in the one position in the circumferential direction in a concentrated manner. Thus, a region where the engine oil cooler and the pre-cooler work as resistance to block the fan stream is limited to the one position in the circumferential direction.

Therefore, as compared to a case in which the engine oil cooler and the pre-cooler are arranged at circumferentially different positions, a decrease in thrust due to the blockage of the fan stream can be suppressed. Fuel consumption can be thereby improved.

Moreover, in the present invention, the engine oil cooler having higher importance for surely operating the engine body is arranged anterior to the pre-cooler, and the pre-cooler is arranged posterior to the engine oil cooler.

Accordingly, the fan stream can be sufficiently introduced into the engine oil cooler from the front regardless of the existence of the pre-cooler.

However, if the pre-cooler and the engine oil cooler are located close to each other due to a small installation space, the engine oil cooler works as resistance against the fan stream for the pre-cooler that is arranged posterior to the engine oil cooler. Moreover, since the pre-cooler introduces the fan stream from the diagonally front by avoiding interference with the engine oil cooler that is arranged anterior to the pre-cooler, it is difficult to introduce the fan stream into the pre-cooler from the front. Introducing the fan stream into the pre-cooler from the diagonally front is disadvantageous in introducing the fan stream since a pressure loss is larger than that of a case in which the fan stream is introduced from the front.

However, the fan stream can be introduced sufficiently enough to secure the heat exchange capacity of the pre-cooler by appropriately designing the positions, forms or the like of an intake port, an exhaust port, and a duct of the pre-cooler.

Even if the fan stream cannot be sufficiently introduced and the engine bleed air is insufficiently cooled to cause a failure in a destination facility where the bleed air is used (an air-conditioning unit or the like), the failure is not as serious as that of a case in which a failure occurs in the engine when the engine oil is insufficiently cooled, and can be treated by an airframe-side system.

In accordance with the above configuration, by longitudinally arranging the engine oil cooler and the pre-cooler in the one position in the circumferential direction of the nacelle such that the engine oil cooler is arranged anterior to the pre-cooler, the heat exchange capacity of each of the engine oil cooler and the pre-cooler can be secured even when there is a limitation to an installation space for accessory machinery. The fuel consumption can be also improved.

In the aircraft of the present invention, the engine oil cooler and the pre-cooler may be longitudinally arranged between a pylon that supports the turbofan engine on a main wing, and the engine body.

The nacelle and the core cowl are each divided into right and left portions. In this case, the engine oil cooler and the pre-cooler can be arranged in an engine access space that is prepared in a gap where left side portions and right side portions of the nacelle and the core cowl face each other on the upper side where a hinge is located.

The engine oil cooler and the pre-cooler may be supported on the pylon.

In the aircraft of the present invention, the engine oil cooler may introduce the fan stream from a front.

Accordingly, the fan stream is allowed to smoothly flow into the engine oil cooler directly from the fan.

In the aircraft of the present invention, a plurality of block members that block passage of the fan stream when a thrust reverser that generates a portion of thrust to a front side is operated may be arranged at intervals in a circumferential direction, and the pre-cooler may introduce the fan stream passing through a gap between the block members adjacent to each other.

Accordingly, the fan stream can be captured even during the operation of the thrust reverser. The heat exchange capacity of the pre-cooler can be thereby secured. Thus, it is possible to operate a destination facility where the engine bleed air is used, such as a cabin air-conditioner, while sufficiently cooling the engine bleed air.

In the aircraft of the present invention, the pre-cooler may include an exhaust port that opens in a direction crossing the fan stream, and a projecting portion that projects in a direction crossing the fan stream on a front side of a peripheral edge of the exhaust port.

Accordingly, the fan stream is turned in a direction away from the exhaust port before the projecting portion. The pressure of the fan stream is thereby increased to generate the effect of reducing a back pressure of the outlet of the exhaust port. Therefore, air is sucked out from the exhaust port, and smoothly discharged.

Consequently, exhaust air from the pre-cooler is not disturbed by exhaust air from the engine oil cooler that is arranged anterior to the pre-cooler and the fan stream, so that the fan stream is stably introduced into and discharged from the pre-cooler. The engine bleed air sufficiently cooled by using the fan stream as the heat source can be thereby stably supplied to the destination of use.

In the turbofan engine of the aircraft of the present invention, the pre-cooler may include an exhaust port that opens in a direction crossing the fan stream, and a louver having a plurality of fins longitudinally arranged in the exhaust port.

Accordingly, the air whose flow is adjusted by the louver smoothly joins the fan stream. Thus, the air stream around the exhaust port is not disturbed. In this point, the louver contributes to smooth exhaust.

In accordance with the present invention, the heat exchange capacity of each of the engine oil cooler and the pre-cooler can be secured even when there is a limitation to the installation space for accessories. The fuel consumption can be also improved.

BRIEF DESCRIPTION OF THE DRAWINGS

FIG. 5A is a perspective view illustrating a view from a line V in FIG. 3; and FIG. 5B is a sectional schematic view; and FIG. 6 is a view illustrating a state in which a portion of a bypass flow path is blocked by blocker doors constituting a thrust reverser.

DETAILED DESCRIPTION OF THE PREFERRED EMBODIMENTS

In the following, an embodiment of the present invention is described by reference to the accompanying drawings.

Figure 1:
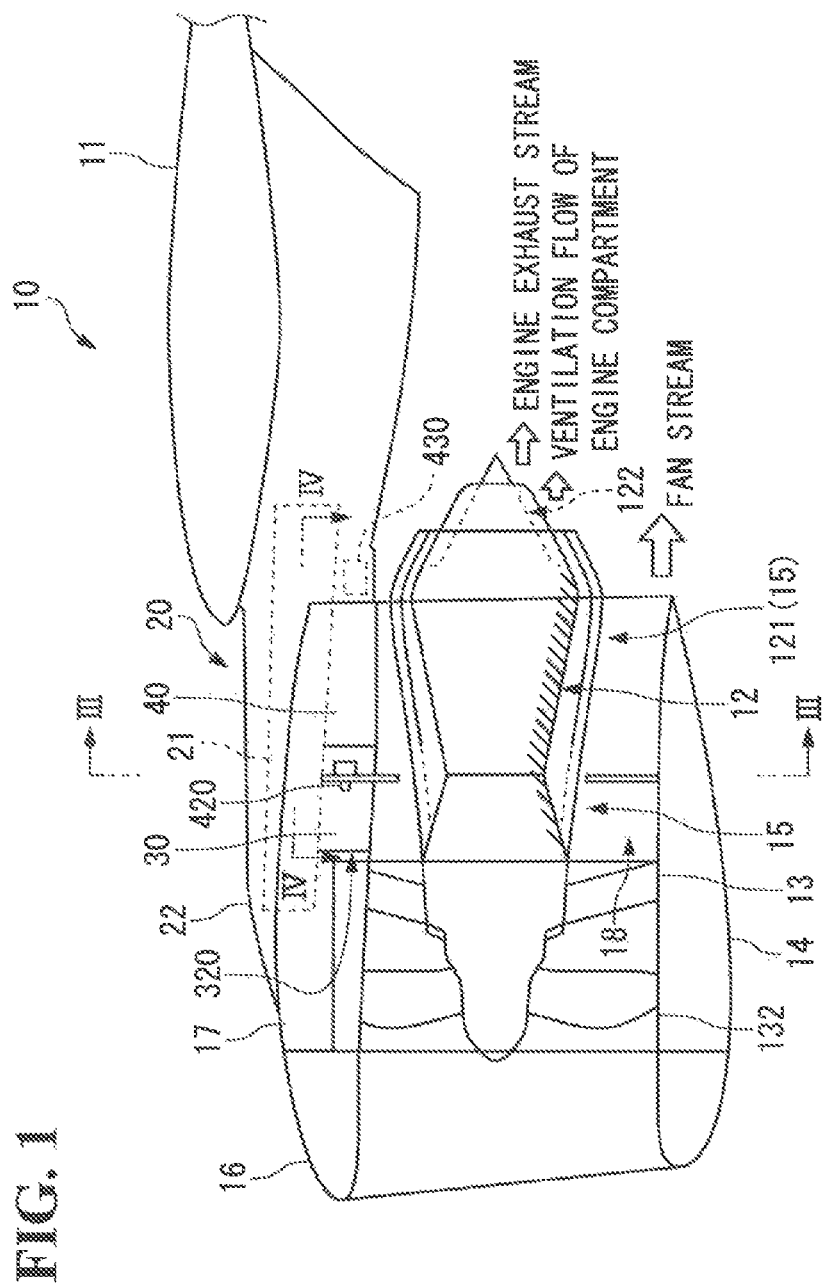
FIG. 1 is a schematic view illustrating a typical cross section of a turbofan engine and a nacelle of an aircraft according to an embodiment of the present invention.

As shown in FIG. 1, an aircraft of the embodiment of the present invention includes a turbofan engine 10.

The turbofan engine 10 is supported on the lower side of a main wing 11 via a pylon 20.

Although the turbofan engine 10 is a geared turbofan engine including a gear mechanism in the present embodiment, the turbofan engine 10 may be also a general turbofan engine not including a gear mechanism.

[Configuration of the Turbofan Engine]

The schematic configuration of the turbofan engine 10 is described.

The turbofan engine 10 includes an engine body 12, a fan 13, a nacelle 14 that constitutes an outer shell of the turbofan engine 10, and a core cowl 15 that is provided on the inner side of the nacelle 14.

In the present specification, a side where the fan 13 is arranged is defined as a "front", and a side opposite thereto is defined as a "back" in the turbofan engine 10.

Unless otherwise noted, a "circumferential direction" is the circumferential direction of the nacelle 14. The circumferential direction of the nacelle 14 corresponds to the circumferential directions of the core cowl 15, the engine body 12, and the fan 13.

The engine body 12 includes a low-pressure compressor, a high-pressure compressor, a reduction gear mechanism that connects respective shafts of the low-pressure compressor and the high-pressure compressor, a combustion chamber, a high-pressure turbine, and a low-pressure turbine although the constituent elements are not shown in the drawings. The constituent elements are accommodated in an engine case 121 (i.e., the core cowl 15). A jet stream formed by the engine body 12 is ejected from an exhaust nozzle 122.

Although not shown in the drawings, the engine body 12 is equipped with various accessories, such as a fuel control unit, a fuel pump, an igniter, and a plurality of heat exchangers.

The accessories and pipes or the like associated with the accessories (hereinafter, referred to as accessory machinery) are densely installed around the engine body 12 and the fan 13, or in engine access spaces S1 and S2 (FIG. 3) described below within the nacelle 14.

The fan 13 is arranged anterior to the engine body 12, and rotated when the torque of the high-pressure turbine or the low-pressure turbine of the engine body 12 is transmitted thereto.

The fan 13 includes a fan body having a plurality of blades 131 (FIG. 2), and a fan case 132.

Figure 2:
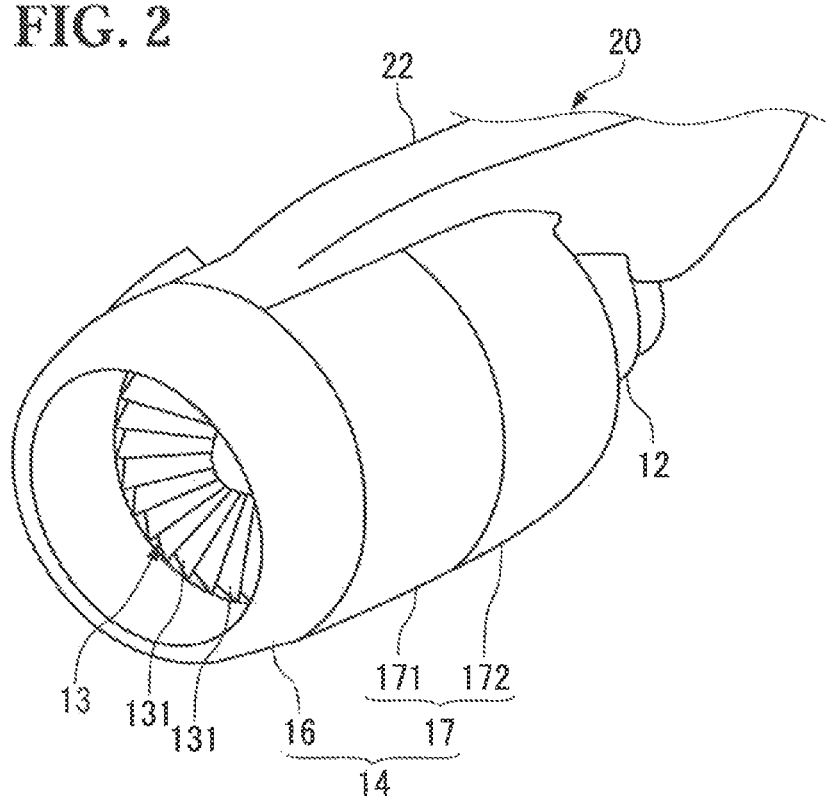
FIG. 2 is a perspective view illustrating the appearance of the turbofan engine.

The nacelle 14 includes an air inlet 16 that is located on a front end, and a cowl 17 that is contiguous to the air inlet 16 as shown in FIG. 2.

The upper limit of the diameter of the nacelle 14 is determined since it is necessary to ensure a height equal to or higher than a specified height between a lower portion of the nacelle 14 and the ground, and it is difficult to increase the length of a main landing gear in order to avoid a weight increase.

The cowl 17 includes a first cowl 171 and a movable second cowl 172.

The first cowl 171 surrounds the fan 13.

The second cowl 172 is normally contiguous to the back side of the first cowl 171, and is slid backward when a thrust reverser is operated. The second cowl 172 surrounds the core cowl 15.

The core cowl 15 surrounds the engine case 121 on the back side of the fan 13 as shown in FIG. 1. Engine compartment ventilation and a fireproof compartment are produced by the core cowl 15.

When air introduced into the nacelle 14 from the air inlet 16 is output backward by the fan 13, the air is divided into a flow supplied into the engine body 12 within the engine case 121 (ventilation of the inside of an engine compartment), and a flow passing through a bypass flow path 18 between the core cowl 15 and the second cowl 172 (a fan stream).

The fan stream further traveling backward from the bypass flow path 18, and the ventilation flow of the engine compartment ejected from the exhaust nozzle 122 join together, and is discharged backward from the turbofan engine 10.

All of the first and second cowls 171 and 172 and the core cowl 15 described above have a form in which the cowl is divided along a longitudinal direction at an upper portion (a twelve o'clock position) and a lower portion (a six o'clock position).

Figure 3:
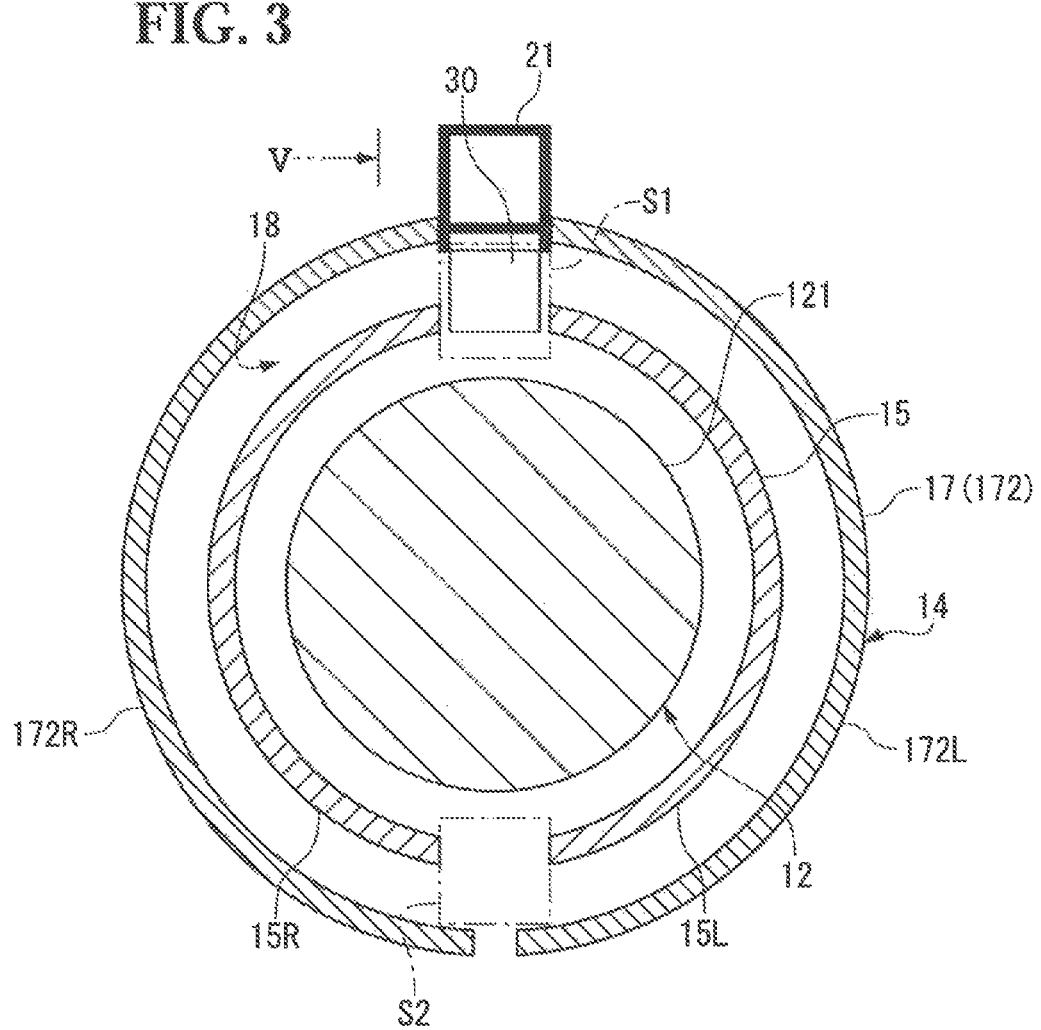
FIG. 3 is a sectional view taken along a line III-III in FIG. 1.

For example, the second cowl 172 includes a right side portion 172R and a left side portion 172L as shown in FIG. 3. The right side portion 172R and the left side portion 172L are supported on a pylon body 21 by a hinge portion (not shown) that is provided at the twelve o'clock position. The right side portion 172R and the left side portion 172L are rotated to the outer side about the hinge portion at the time of maintenance.

A right side portion 15R and a left side portion 15L of the core cowl 15, and a right side portion and a left side portion (not shown) of the first cowl 171 are also similarly configured.

The engine access space S1 for installing the accessory machinery is prepared in a gap where the right side portion and the left side portion each having an arc shape in section face each other on the twelve o'clock side. The engine access space S2 for installing the accessory machinery is prepared in a gap where the right side portion and the left side portion face each other on the six o'clock side.

The engine access space S1 is formed between the pylon body 21 and the engine body 12.

The engine access space S2 is formed between the nacelle 14 and the engine body 12.

As shown in FIG. 3, an upper portion (the twelve o'clock position) of the bypass flow path 18 is used as the engine access space S1. A lower portion (the six o'clock position) of the bypass flow path 18 is used as the engine access space S2 for installing the accessory machinery.

The engine access space S1 is formed continuously or intermittently from the front end to the back end of the core cowl 15.

In the present embodiment, the diameter of the engine body 12 with respect to the diameter of the nacelle 14 is larger than that of a typical case. Thus, a distance between the outer periphery of the core cowl 15 and the inner periphery of the second cowl 172 is small. Therefore, the bypass flow path 18 also used as the engine access spaces S1 and S2 has a small radial dimension.

Moreover, the circumferential widths of the engine access spaces S1 and S2 are set to be small in order to ensure a flow path sectional area of the bypass flow path 18 and thereby obtain required thrust.

Thus, the engine access spaces S1 and S2 do not have a volume large enough to arrange the accessory machinery therein with a margin.

That is, an installation space for the accessory machinery is limited due to the small distance between the core cowl 15 and the second cowl 172.

Figure 4:
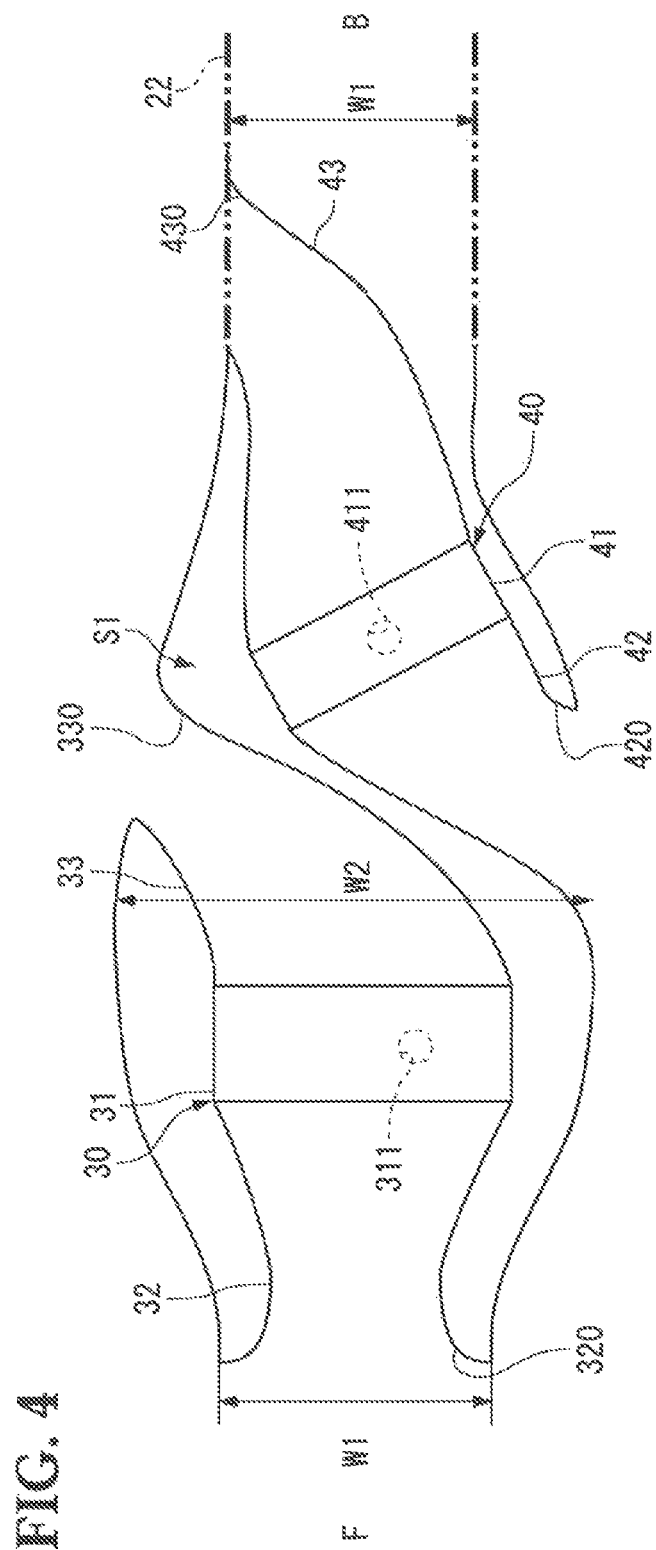
FIG. 4 is a schematic view illustrating an engine oil cooler and a pre-cooler from above.

As shown in FIG. 4, in the engine access spaces S1 and S2 (only S1 is shown), a width W2 in a center portion is larger than a width W1 on the both ends of a front side F and a back side B similarly to the nacelle 14.

In the engine access spaces S1 and S2, a height (a dimension in a direction perpendicular to the paper plane in FIG. 4) in the longitudinal center portion is also higher than a height on the front and back ends. This is because the engine body 12 is reduced in diameter as shown in FIG. 1.

That is, the engine access spaces S1 and S2 have a volume barely large enough to install the accessories in the center portion and a surrounding region thereof.

In the present embodiment, an engine oil cooler 30 and a pre-cooler 40 are installed by use of the center portion of the engine access space S1 that is expanded with respect to the front and back ends.

The pylon 20 includes the pylon body 21 that is a structural member, and an aerodynamic cover 22 (a pylon fairing) that covers the pylon body 21 as shown in FIG. 1.

The pylon body 21 is formed in a box-like shape having a rectangular shape in section, and extends in the longitudinal direction.

Respective pipes, wires or the like of a fuel system, a hydraulic system, and an electrical system are accommodated in the pylon body 21. The pylon body 21 is also shaped so as to be expanded in a center portion with respect to front and back ends similarly to the engine access space S1.

A lower portion of the pylon body 21 faces the engine access space S1 as shown in FIG. 3.

The width of the pylon body 21 is also set to be small so as not to disturb the fan stream flowing around the engine access space S1.

Although the large accessories such as the engine oil cooler 30 and the pre-cooler 40 are preferably accommodated in the pylon body, there is not enough space to accommodate the accessories in the pylon body 21 of the present embodiment due to the small width.

In the present embodiment, the engine oil cooler 30 and the pre-cooler 40 are suspended from the lower portion of the pylon body 21, and thereby supported as shown in FIG. 1.

[Configuration of the Engine Oil Cooler and the Pre-Cooler]

Now, the engine oil cooler 30 (air oil cooler or fuel oil cooler) and the pre-cooler 40 supported by the pylon body 21 and arranged in the engine access space S1 are described by reference to FIG. 4.

The engine oil cooler 30 and the pre-cooler 40 are arranged longitudinally close to each other in the engine access space S1 between the pylon body 21 and the engine body 12 due to the limitation on the installation space.

[Configuration of the Engine Oil Cooler]

The engine oil cooler 30 is a heat exchanger that cools engine oil used in the engine body 12 for lubricating a sliding section or the like by using the fan stream as a heat source (a low-temperature source).

In the present embodiment, since the reduction gear mechanism slides at high speed to thereby generate heat, the engine oil tends to have a high temperature. Therefore, a large engine oil cooler having a high heat exchange capacity as compared to a case in which the engine oil cooler is mounted to a general turbofan engine not including the reduction gear mechanism is employed as the engine oil cooler 30.

If the engine oil is not sufficiently cooled, the engine body 12 may operate unstably or stop operating. The operating life of an engine high-temperature component (a turbine bearing or the like) may be also reduced. Therefore, it is important to sufficiently exert the heat exchange capacity of the engine oil cooler 30.

To this end, the fan stream needs to be sufficiently introduced into the engine oil cooler 30.

The engine oil cooler 30 includes a body 31 having a heat exchange capacity, an AOC intake duct 32, and an AOC exhaust duct 33.

The body 31 is of plate fin type where plate-like tubes and corrugate fins are laminated, and is formed in a rectangular parallelepiped shape.

Various types known as a heat exchanger, such as a fin and tube type, may be also applied to the body 31. The same applies to a body 41 of the pre-cooler 40.

The body 31 is arranged perpendicular to or substantially perpendicular to the fan stream flowing from the front to the back so as to efficiently receive the fan stream.

A lead-in pipe 311 for leading the engine oil from the engine body 12 into the plate tube is connected to a lower portion of the body 31. A lead-out pipe (not shown) for returning the engine oil from inside the plate tube to the engine body 12 is also connected to the body 31.

The AOC intake duct 32 is connected to the front side of the body 31, and opens in the front end of the engine access space S1. An intake port 320 of the AOC intake duct 32 is located at the origin of the fan stream, and directed forward. The air output from the fan 13 directly flows into the intake port 320. Thus, the fan stream is sufficiently introduced into the engine oil cooler 30.

The AOC exhaust duct 33 is connected to the back side of the body 31, and opens on one widthwise end side (here, the right side) of the engine access space S1. An exhaust port 330 of the AOC exhaust duct 33 is directed diagonally backward.

Heat exchange is performed between the fan stream sucked by the AOC intake duct 32, and discharged from the AOC exhaust duct 33 through the body 31, and the engine oil flowing through the plate tube of the body 31.

In order to reduce a pressure loss, the entire length of the ducts 32 and 33 needs to be short, and it is necessary to form a smooth continuous flow path from the introduction to the discharge of the fan stream in the ducts 32 and 33. The same applies to ducts 42 and 43 of the pre-cooler 40.

It is also preferable to form a recess in a portion where interference with the other accessory machinery or the engine case 121 needs to be avoided, in any of the ducts 32 and 33 and the ducts 42 and 43.

[Configuration of the Pre-Cooler]

Next, the pre-cooler 40 is a heat exchanger that cools bleed air from the engine body 12 by using the fan stream as a heat source.

The bleed air from the engine body 12 is obtained by extracting a portion of air compressed within the engine body 12. Although its temperature and pressure vary depending on whether the bleed air is extracted downstream of the low-pressure compressor or downstream of the high-pressure compressor, the bleed air has a high temperature and pressure in any case.

Since it is difficult to directly use the engine bleed air as a heat source in a cabin air-conditioner or the like, the engine bleed air is cooled to a temperature at which the bleed air can be used for the air-conditioner or the like by the pre-cooler 40 that is arranged upstream of a destination where the engine bleed air is used.

Examples of the destination where the engine bleed air is used include an air-conditioner in a cabin, and various anti-ice systems.

The engine bleed air cooled by the pre-cooler 40 is also used for pressurizing the inside of the aircraft.

The pre-cooler 40 includes the body 41 having a heat exchange capacity, the PC intake duct 42, and the PC exhaust duct 43.

The body 41 is of plate fin type similarly to the body 31 of the engine oil cooler 30.

The body 41 is arranged posterior to the body 31 of the engine oil cooler 30. The body 41 is arranged diagonally with respect to the fan stream so as to avoid interference with the body 31 and the exhaust duct 33 of the engine oil cooler 30.

A lead-in pipe 411 for leading the engine bleed air from the engine body 12 into the plate tube of the body 41 is connected to a lower portion of the body 41. A lead-out pipe (not shown) for sending the cooled engine bleed air from inside the plate tube to the destination of use is also connected to the body 41.

The PC intake duct 42 is connected to the front side of the body 41, and opens on the left side of the engine access space S1. An intake port 420 of the PC intake duct 42 is directed diagonally forward.

The intake port 420 is located on the opposite side from the exhaust port 330 of the AOC exhaust duct 33. This is because the cooling efficiency of the pre-cooler 40 is reduced when the air discharged from the exhaust port 330 of the engine oil cooler 30 is sucked from the intake port 420.

A so-called NACA scoop (an NACA duct) can be employed for the PC intake duct 42. The NACA scoop is formed so as to have a small inlet, and gradually expand from the inlet to the downstream side. Since the NACA scoop has extremely small air resistance, the fan stream can be efficiently introduced.

The PC exhaust duct 43 is connected to the back side of the body 41, and opens on the same side (the right side) as the opening of the AOC exhaust duct 33. An exhaust port 430 of the PC exhaust duct 43 is directed diagonally backward, and located posterior to the intake port 420. The exhaust port 430 is formed in the aerodynamic cover 22 on the outer side of the engine access space S1. The intake port 320 and the exhaust port 330 of the engine oil cooler 30, and the intake port 420 of the pre-cooler 40 can be also formed in the aerodynamic cover 22 that covers the pylon body 21.

Heat exchange is performed between the fan stream sucked by the PC intake duct 42, and discharged from the PC exhaust duct 43 through the body 41, and the engine bleed air flowing through the plate tube of the body 41.

[Design of the Exhaust Port of the Pre-Cooler]

A specific configuration for enabling smooth exhaust from the PC exhaust duct 43 is described.

Figure 5A:
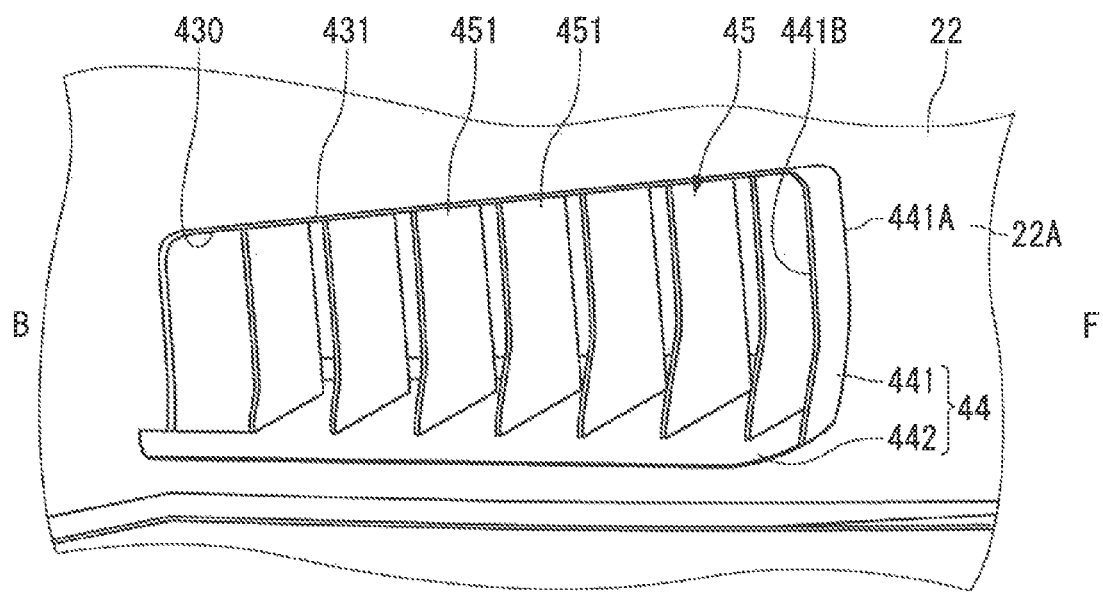
FIGS. 5A and 5B show an exhaust port of the pre-cooler.

As shown in FIG. 5A, the PC exhaust duct 43 includes the exhaust port 430 having a rectangular shape here, a tab plate 44 (a projecting portion) that is located on a peripheral edge 431 of the exhaust port 430, and a louver 45 that is located in the exhaust port 430.

Figure 5B:
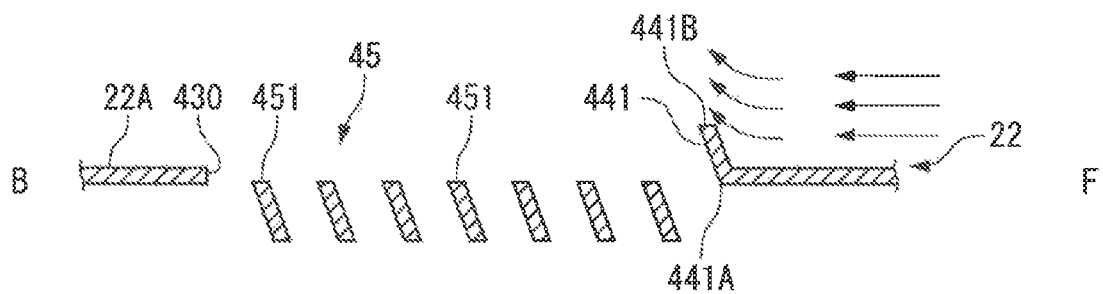

In FIGS. 5A and 5B, the front side is indicated by F and the back side is indicated by B.

The exhaust port 430 is located in a side surface 22A of the aerodynamic cover 22 of the pylon 20.

The exhaust port 330 of the engine oil cooler 30 is also located in the side surface 22A of the aerodynamic cover 22 on the front side F with respect to the exhaust port 430.

The tab plate 44 is formed so as to project from the side surface 22A on the peripheral edge 431 of the exhaust port 430.

The tab plate 44 has a front-side tab 441 located on the front side F of the peripheral edge 431, and a lower-side tab 442 located on the lower side of the peripheral edge 431.

The front-side tab 441 is formed in a band-like shape along the front side F of the peripheral edge 431. As shown in FIG. 5B, a distal end 441B of the front-side tab 441 is located posterior to a proximal end 441A of the front-side tab 441 that is contiguous to the side surface 22A. That is, the front-side tab 441 diagonally stands from the side surface 22A.

The lower-side tab 442 is formed in a band-like shape along the lower side of the peripheral edge 431. The lower-side tab 442 vertically stands from the side surface 22A.

The lower end of the front-side tab 441 and the front end of the lower-side tab 442 are contiguous to each other. Accordingly, the exhaust port 430 is surrounded from two directions of the front side F and the lower side.

The louver 45 has a plurality of fins 451 that are arranged in the longitudinal direction.

The fins 451 are inclined in the same direction as the front-side tab 441, and backwardly adjust the flow of the air discharged from the exhaust port 430.

As described above, the exhaust port 330 of the engine oil cooler 30 is located on the front side F with respect to the exhaust port 430. The air heat-exchanged with the engine oil is ejected from the exhaust port 330 toward the exhaust port 430. The air joins the fan stream flowing along the side surface 22A of the aerodynamic cover 22 from the bypass flow path 18.

The tab plate 44 described above works to prevent the air ejected from the exhaust port 330 of the engine oil cooler 30 as described above and the fan stream from disturbing the exhaust air from the exhaust port 430.

The front-side tab 441 of the tab plate 44 projects in a direction crossing the fan stream on the front side F of the peripheral edge 431 of the exhaust port 430. Therefore, the fan stream is turned in a direction away from the exhaust port 430 as indicated by arrows in FIG. 5B before the tab plate 44. The pressure of the fan stream is thereby increased to generate the effect of reducing an outlet pressure (a back pressure) of a front surface of the exhaust port 430. Accordingly, the air is sucked out from the exhaust port 430, and smoothly discharged.

The air whose flow is adjusted by the louver 45 smoothly joins the fan stream. Thus, the air stream around the exhaust port 430 is not disturbed. In this point, the louver 45 contributes to the smooth exhaust.

As described above, mainly by providing the front-side tab 441, the exhaust air from the pre-cooler 40 is not disturbed by the exhaust air from the engine oil cooler 30 and the fan stream, so that the fan stream is stably introduced into and discharged from the pre-cooler 40. Accordingly, the engine bleed air sufficiently cooled by using the fan stream as the heat source can be stably supplied to the destination of use.

If the front-side tab 441 projects perpendicular to the fan stream, or is inclined such that the proximal end 441A is located posterior to the distal end 441B, the air is sucked out from the exhaust port 430 by the same action as above. However, a swirling air stream is easily generated around the exhaust port 430. The effect of sucking out the air may be reduced by the swirl. Thus, the front-side tab 441 is preferably inclined such that the distal end 441B is located posterior to the proximal end 441A (FIG. 5B).

Since the exhaust port 430 is surrounded by the front-side tab 441 and the lower-side tab 442, the exhaust air from the engine oil cooler 30 is prevented from entering the exhaust port 430 to decrease a flow rate in the pre-cooler 40. That is, an intake/exhaust amount meeting cooling performance required for the pre-cooler 40 can be ensured.

Although the exhaust port 430 of the present embodiment opens in a direction crossing the fan stream, the exhaust port of the pre-cooler 40 may also open along the fan stream.

[Positional Relationship Between the Engine Oil Cooler and the Pre-Cooler]

A positional relationship between the engine oil cooler 30 and the pre-cooler 40 described above is described.

The engine oil cooler 30 and the pre-cooler 40 are longitudinally arranged in the engine access space S1 (FIG. 4), and thereby arranged in one position (here, an upper portion) in the circumferential direction in a concentrated manner. Accordingly, a region where the engine oil cooler 30 and the pre-cooler 40 work as resistance to block the fan stream is limited to the one position in the circumferential direction.

On the other hand, if the engine oil cooler 30 and the pre-cooler 40 are arranged at circumferentially different positions from each other (regardless of the longitudinal positions thereof), the fan stream is blocked by the engine oil cooler 30, and also blocked by the pre-cooler 40.

That is, by arranging the engine oil cooler 30 and the pre-cooler 40 in the one position in the circumferential direction, a decrease in thrust due to the blockage of the fan stream can be suppressed. Fuel consumption can be thereby improved.

In the present embodiment, the engine oil cooler 30 is arranged behind the fan 13, and the pre-cooler 40 is arranged posterior to the engine oil cooler 30 in consideration of the importance of the engine oil cooler 30.

Accordingly, the fan stream can be directly introduced into the engine oil cooler 30 from the fan 13. The heat exchange capacity of the engine oil cooler 30 can be thereby fully exerted.

On the other hand, the pre-cooler 40 introduces the fan stream therein via the PC intake duct 42 that opens diagonally forward by avoiding interference with the body 31 and the exhaust duct 33 of the engine oil cooler 30 that is arranged anterior to the pre-cooler 40. This is disadvantageous in introducing the fan stream since a pressure loss is larger than that of a case in which the fan stream is introduced from the front as in the engine oil cooler 30.

However, as described in the present embodiment based on one example, the fan stream can be introduced sufficiently enough to secure the heat exchange capacity of the pre-cooler 40 by appropriately designing the positions, forms or the like of the intake port 420, the exhaust port 430, and the ducts 42 and 43 of the pre-cooler 40.

As described above, in accordance with the present embodiment, the heat exchange capacity of each of the engine oil cooler 30 and the pre-cooler 40 can be secured under the limitation on the installation space for the accessory machinery, and the fuel consumption can be also improved.

In the present embodiment, the circumferential position (region) where the engine oil cooler 30 and the pre-cooler 40 are arranged is not limited to the upper portion, and may be also a lower portion or other positions.

[Positional Relationship Between a Blocker Door and the Intake Ports of the Engine Oil Cooler and the Pre-Cooler]

By the way, the aircraft includes a thrust reverser that generates a portion of thrust toward the front side. The thrust reverser assists braking when an overrun is likely to be caused by using only other braking mechanisms such as a wheel brake of a main landing gear.

The thrust reverser of the turbofan engine 10 includes a blocker door 19 (FIG. 6) that blocks passage of the fan stream, and reverses the fan stream to the front side, and an air discharge section (not shown) that discharges the fan stream blocked by the blocker door 19 to the diagonally front side. The air discharge section is located in a gap formed between the first cowl 171 and the second cowl 172 when the second cowl 172 is slid backward.

As shown in FIG. 6, a plurality of blocker doors 19 are arranged in the bypass flow path 18 at intervals in a circumferential direction.

For example, the blocker doors 19 are attached to the inner side of the second cowl 172 by hinges so as to be able to be changed in position between a position along the inner periphery of the second cowl 172 and a position erected from the inner periphery of the second cowl 172 (FIG. 6).

When the thrust reverser is operated, each of the blocker doors 19 is erected, and a portion of the bypass flow path 18 is blocked by each of the blocker doors 19. The fan stream flowing backward from the blocker doors 19 is thereby reduced.

Therefore, the intake ports 320 and 420 of the engine oil cooler 30 and the pre-cooler 40 are preferably located anterior to the blocker doors 19. Accordingly, the fan stream is ensured around the intake ports 320 and 420 even during the operation of the thrust reverser, so that the heat exchange capacity can be secured by introducing the fan stream from the intake ports 320 and 420.

In the present embodiment, however, while the intake port 320 of the engine oil cooler 30 is located anterior to the blocker doors 19, a part of the intake port 420 of the pre-cooler 40 is located posterior to the blocker doors 19 as a result of avoiding interference with the engine oil cooler 30 and the other accessory machinery.

In this case, the intake port 420 of the pre-cooler 40 is preferably arranged behind (at the back of) a gap between the blocker door 19 and the blocker door 19 adjacent to each other.

Accordingly, the fan stream passing through the gap between the adjacent blocker doors 19 and 19 can be captured by the intake port 420. The heat exchange capacity of the pre-cooler 40 can be secured even during the operation of the thrust reverser.

Therefore, even during the operation of the thrust reverser, it is possible to operate a cabin air-conditioner, an anti-ice system or the like while sufficiently cooling the engine bleed air.

The constitutions described in the embodiment described above may be also freely selected or changed into other constitutions without departing from the scope of the present invention.

Although the engine oil cooler 30 and the pre-cooler 40 are longitudinally arranged on the outer side of the pylon body 21 in the above embodiment, the engine oil cooler and the pre-cooler may be also longitudinally arranged on the inner side of the pylon body in the present invention. When the engine oil cooler and the pre-cooler are arranged in one position in the circumferential direction in a concentrated manner even within the pylon body, a decrease in thrust due to the blockage of the fan stream can be also suppressed.

What is claimed is:

1. An aircraft comprising a turbofan engine provided with an engine body, a core cowl surrounding the engine body, a fan located anterior to the engine body, and a nacelle surrounding the core cowl and the fan, the fan producing a fan stream flowing from the fan into a gap between the core cowl and the nacelle, the fan stream dividing into at least a first fan stream portion and a second fan stream portion, the aircraft further comprising:
    an engine oil cooler that is a first heat exchanger for cooling engine oil used in the engine body by using the first fan stream portion as a first cooling source, the engine oil cooler defining a first passageway that the first fan stream portion flows through; and
    a pre-cooler that is a second heat exchanger for cooling bleed air from the engine body by using the second fan stream portion as a second cooling source, the pre-cooler defining a second passageway that the second fan stream portion flows through,
    wherein the engine oil cooler and the pre-cooler are in one position in a circumferential direction of the nacelle,
    the engine oil cooler and the pre-cooler are longitudinally arranged along an axial direction of the engine body such that the engine oil cooler is located anterior to the pre-cooler along the axial direction of the engine body, and
    a duct wall separates the first fan stream portion from the second fan stream portion, the duct wall having a first portion that defines an intake port of the engine oil cooler, a second portion that defines an exhaust port of the engine oil cooler, and an intermediate portion between the first portion and second portion that extends oblique to the axial direction.

2. The aircraft according to claim 1,
    wherein the engine oil cooler and the pre-cooler are longitudinally arranged between a pylon that supports the turbofan engine on a main wing and the engine body.

3. The aircraft according to claim 2,
    wherein the engine oil cooler and the pre-cooler are supported on the pylon.

4. The aircraft according to claim 1,
    wherein the engine oil cooler introduces the first fan stream portion from a front side of the engine oil cooler that faces the fan.

5. The aircraft according to claim 1,
wherein a plurality of block members that block passage of the fan stream when a thrust reverser that generates a portion of thrust to a front side is operated are arranged at intervals in the circumferential direction, and
the pre-cooler introduces the second fan stream portion passing through a block member gap between the block members adjacent to each other.

6. The aircraft according to claim 1, wherein the engine oil cooler and the pre-cooler are suspended from a lower portion of a pylon body and thereby supported.

7. The aircraft according to claim 6, wherein the pylon body has a rectangular shape in cross section and extends longitudinally along the axial direction of the engine body.

8. The aircraft according to claim 7, wherein the lower portion of the pylon body faces an engine access space, and the engine oil cooler and the pre-cooler are arranged in the engine access space.

9. The aircraft according to claim 1, wherein the turbofan engine is a geared turbofan engine.

10. The aircraft according to claim 1, wherein the engine body includes a low-pressure compressor, a high-pressure compressor, a reduction gear mechanism that connects a shaft of the low-pressure compressor and a shaft of the high-pressure compressor, a combustion chamber, a high-pressure turbine, and a low-pressure turbine.

11. An aircraft comprising a turbofan engine provided with an engine body and a fan located anterior to the engine body, the fan producing a fan stream flowing from the fan into a gap between a core cowl surrounding the engine body and a nacelle surrounding the fan and the core cowl, the fan stream dividing into at least a first fan stream portion and a second fan stream portion, the aircraft further comprising:
an engine oil cooler that is a first heat exchanger for cooling engine oil used in the engine body by using the first fan stream portion as a first cooling source, the engine oil cooler defining a first passageway that the first fan stream portion flows through; and
a pre-cooler that is a second heat exchanger for cooling bleed air from the engine body by using the second fan stream portion as a second cooling source, the pre-cooler defining a second passageway that the second fan stream portion flows through,
wherein the engine oil cooler and the pre-cooler are longitudinally arranged in one position in a circumferential direction of the nacelle,
the engine oil cooler is located anterior to the pre-cooler,
the engine oil cooler and the pre-cooler are configured in such a manner that an exhaust port of the engine oil cooler and an intake port of the pre-cooler are each in direct communication with a space within the nacelle, and
a duct wall separates the first fan stream portion from the second fan stream portion, the duct wall having a first portion that defines an intake port of the engine oil cooler, a second portion that defines the exhaust port of the engine oil cooler, and an intermediate portion between the first portion and the second portion that extends oblique to an axial direction of the engine body.

12. The aircraft according to claim 11, wherein the exhaust port of the engine oil cooler and the intake port of the pre-cooler are formed in an aerodynamic cover that covers a pylon body.

13. The aircraft according to claim 12, wherein the intake port of the engine oil cooler is formed in the aerodynamic cover that covers the pylon body.

14. The aircraft according to claim 11, wherein the turbofan engine is a geared turbofan engine.

15. An aircraft comprising a turbofan engine provided with an engine body and a fan located anterior to the engine body, the fan producing a fan stream flowing from the fan into a gap between a core cowl surrounding the engine body and a nacelle surrounding the fan and the core cowl, the fan stream dividing into at least a first fan stream portion and a second fan stream portion, the aircraft further comprising:
an engine oil cooler that is a first heat exchanger for cooling engine oil used in the engine body by using the first fan stream portion as a first cooling source, the engine oil cooler defining a first passageway that the first fan stream portion flows through; and
a pre-cooler that is a second heat exchanger for cooling bleed air from the engine body by using the second fan stream portion as a second cooling source, the pre-cooler defining a second passageway that the second fan stream portion flows through,
wherein the engine oil cooler and the pre-cooler are longitudinally arranged in one position in a circumferential direction of the nacelle,
the engine oil cooler is located anterior to the pre-cooler,
the engine oil cooler and the pre-cooler are supported by a lower portion of a pylon, and
a duct wall separates the first fan stream portion from the second fan stream portion, the duct wall having a first portion that defines an intake port of the engine oil cooler, a second portion that defines an exhaust port of the engine oil cooler, and an intermediate portion between the first portion and the second portion that extends oblique to an axial direction of the engine body.

16. The aircraft according to claim 1, wherein the intermediate portion of the duct wall defines the first passageway of the engine oil cooler.

17. The aircraft according to claim 1, wherein the first portion of the duct wall is offset from the second portion of the duct wall in the circumferential direction of the nacelle.

18. The aircraft according to claim 1, wherein the intermediate portion of the duct wall meanders from the first portion of the duct wall to the second portion of the duct wall.

* * * * *